__United States Patent Office__ 3,000,263
Patented Sept. 19, 1961

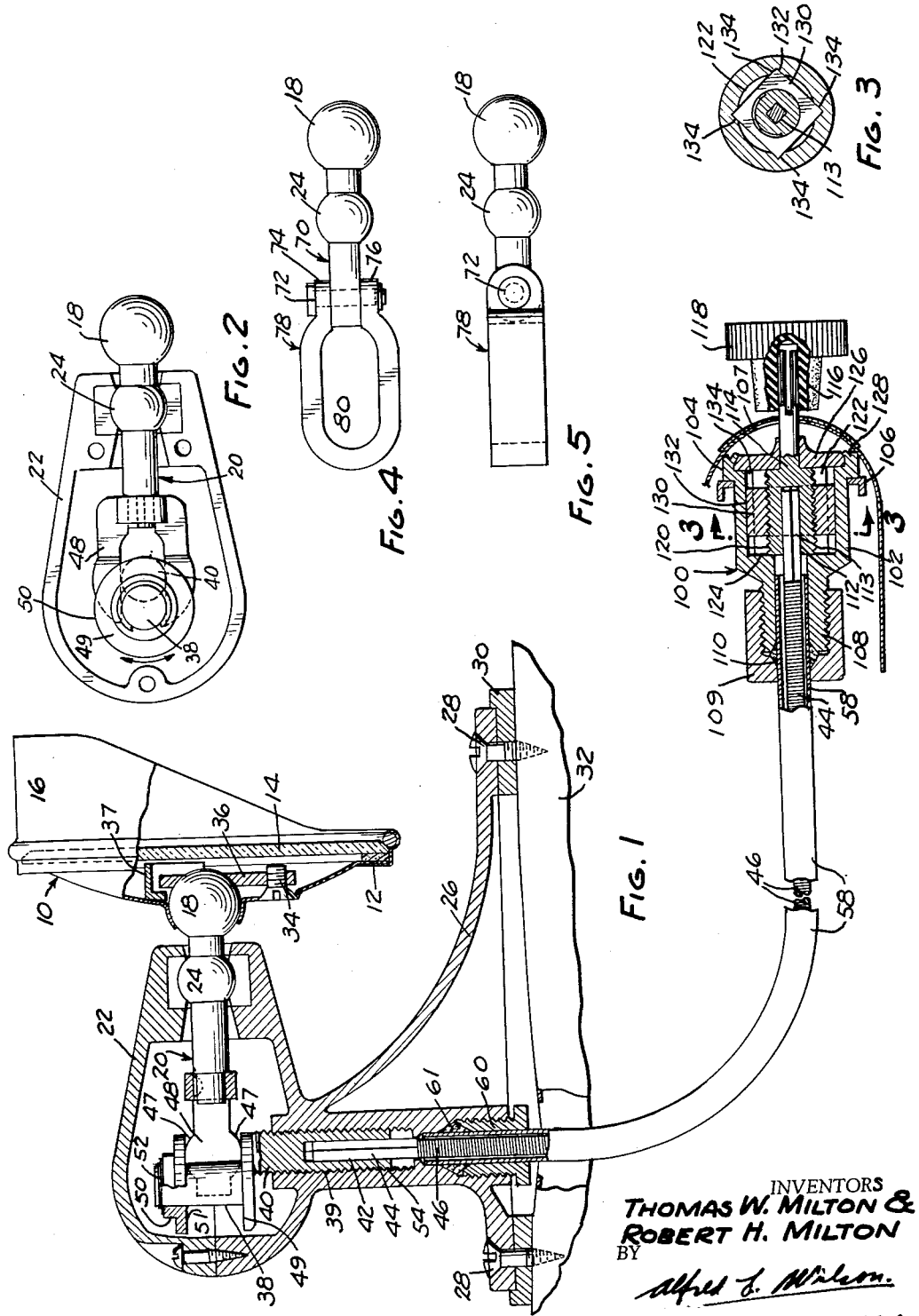

3,000,263
REMOTE CONTROL MECHANISM FOR
AUTOMOTIVE ACCESSORIES
Thomas Willard Milton and Robert H. Milton, both of
32934 N. River Road, Mount Clemens, Mich.
Filed June 12, 1957, Ser. No. 665,338
5 Claims. (Cl. 88—93)

This invention relates to rear view mirrors, and more particularly to rear view mirrors positioned on the outside of a vehicle and actuated by a mechanical linkage extending to a control knob positioned within easy reach of the driver or a passenger seated within the passenger compartment of the vehicle.

As the driving speed of motor vehicles advances, it becomes increasingly important that the rear view mirrors be located as nearly in the line of vision as may be practicable. Also, on our superhighways nearly as many overtaking cars pass on the right side as on the left, which points up the necessity for a rear view mirror on the right side of the vehicle, and this right hand side mirror should be located at a point which would disclose the immediate hazard of a car in close proximity. The obvious solution is to locate a mirror on each front fender. The advent of wrap around windshields has made such locations practical, providing the mirrors are positioned far enough forward to escape the aberration caused by looking through the curved glass of the windshield. However, this is only half a solution unless the mirrors can be adjusted from the driving position, because a helper is not always available to correct the angularity for the drivers of varying stature who may alternately operate the same vehicle, or to restore the desired angular position after an ambitious service station attendant has accidently shifted the setting in the course of his routine cleaning service. Our invention meets every one of these conditions.

Our copending applications Serial No. 522,671 filed July 18, 1955, now Patent No. 2,933,019, and Serial No. 550,945 filed December 5, 1955, now Patent No. 2,919,599, disclose mechanical connections extending from a manually operable control member positioned within the vehicle to the rear view mirror positioned on the vehicle forwardly of the passenger compartment.

Our earlier filed application embodies a single control member operable through an eccentric drive to shift the mirror back and forth to provide a desired degree of horizontal adjustment. The eccentric member is carried by a screw so as to move vertically as the back and forth or scanning movement of the eccentric member progresses due to continued rotation of the screw to effect a vertical adjustment of the mirror. Difficulties have been encountered with that construction because when the threaded member was turned in either direction to the end of its travel, the mechanism became wedged against the top or the bottom of the case or body.

An object of this invention resides in the provision of an improved rear view mirror positioning control mechanism wherein a single manually operable knob is employed to vary the angular position of the mirror in horizontal and vertical planes.

Another object of our invention is to provide an improved remote control mechanism for a rear view mirror wherein positive limit stop mechanism is employed to restrict the range of the adjusting movement of a control mechanism.

A further object of our invention is to provide an improved control knob having limit stops to prevent the actuating mechanism from binding or locking up at the end of its travel.

Still a further object of our invention is to provide an improved motion translating mechanism having a yoke for converting rotational movement of a threaded member having an eccentric drive member into angular movement of a mirror carrying member.

Yet another object of our invention resides in the provision of an improved bifurcated yoke member engaging an eccentric driving member to transmit rotational and longitudinal movement of the eccentric member into horizontal and vertical adjustment of a mirror carrying member.

Other objects and advantages of this invention will be apparent from the following description, considered in conjunction with the accompanying drawings submitted for purposes of illustration and not to define the scope of the invention, reference being had for that purpose to the following claims.

In the drawings wherein similar reference characters refer to similar parts throughout the several views:

FIG. 1 is a longitudinal sectional view of our improved control and actuating mechanism for adjusting from a remote point, the horizontal and vertical positions of a rear view mirror.

FIG. 2 is a top plan view of the partially disassembled actuating mechanism embodied in the construction of FIG. 1.

FIG. 3 is a sectional view taken substantially on the line 3—3 of FIG. 1 looking in the direction of the arrows.

FIGS. 4 and 5 are plan and side elevational views of a modified form of motion translating mechanism wherein a closed yoke is employed for use in the actuating mechanism illustrated in FIG. 1.

Before explaining in detail the present invention it is to be understood that the invention is not limited in its application to the details of construction and arrangement of parts illustrated in the accompanying drawings, since it is capable of other embodiments and of being practiced or carried out in various ways. Also it is to be understood that the phraseology or terminology employed herein is for purpose of description and not of limitation.

Our invention is particularily applicable when applied to the control of a rear view mirror positioned at such a distance from the passenger compartment that it is impossible for the driver or other occupant of the vehicle while seated in the passenger compartment to reach the mirror to directly make desired angular adjustments.

Referring particularly to FIG. 1, our remote control mechanism is illustrated as applied to the control of a rear view mirror assembly 10 carried by a suitable casing 12 and having a reflecting glass 14 and a visor 16. The casing 12 is mounted on the spherical end 18 of a rearwardly directed mirror carrying member 20 journalled in a housing 22 at 24.

The housing 22 has a base 26 secured in any convenient manner as by screws 28 preferably extending through a mounting pad 30 to a portion 32 such as a front fender or other suitable portion of a motor vehicle. The mounting pad 30 may have its upper surface suitably contoured to receive the base 26, and may be shaped to conform with the contour of a fender or other portion of a vehicle to which it is desired to secure the accessory to be actuated by our remote control mechanism.

The mirror supporting casing 12 mounted on the rear end 18 of the mirror carrying member 20 may be clamped thereto in any desired angular position by a screw 34 which draws plate 36 into firm contact with the rounded end 18 of member 20.

We employ a compound motion transmitting device in the form of an eccentric driving member carried by a threaded member 40 to produce a scanning action by oscillating the mirror in a series of essentially horizontal planes as the threaded member is rotated, each half rotational movement of the threaded member oscillating the mirror carrying member to shift it slightly higher or slightly lower than the previous oscillation depending on the pitch of the thread.

The base 26 has a threaded aperture 39 extending therethrough substantially at right angular relation to the mirror carrying member 20. The threaded member 40 has a non-round cavity 42 into which a matching terminal 44 on the flexible shaft 46 is a sliding fit.

Any suitable motion transmitting means may be employed to translate the rotational movement of the threaded member 40 into lateral oscillating movement of the mirror carrying member 20 in essentially perpendicular and horizontal planes about the journal point 24. One suitable motion transmitting means is illustrated in FIGS. 1 and 2 wherein an open yoke 48 mounted on the mirror carrying member 20 engages crank 38 carried by the threaded member 40 and thereby translates the oscillation of the threaded member 40 into lateral movement of mirror carrying member 20 to shift it angularly about journal point 24 in a horizontal plane.

Yoke 48 has rounded ends 47 which contact the surface 49 of member 40 and surface 51 of the cap member 50 throughout the range of vertical travel of the threaded member 40. Cap member 50 is slidably mounted on crank 38 and is secured in assembled relation therewith by a spring lock ring 52.

The flexible shaft 46 is preferably housed within a flexible conduit 58. One end of this conduit is secured to the lower end of the cylinder in the base 26 as by the compression fitting 60 bearing against the ferrule 61.

A modified form of mirror carrying and motion translating mechanism is illustrated in FIGS. 4 and 5. A rod journalled at 24 has the spherical end 18 to receive the rear view mirror assembly 10. The end of the rod 70 remote from the spherical end 18 is apertured to receive a pin 72 projecting through the spaced legs 74 and 76 of a closed yoke 78 having an elongated slot 80 to receive the crank 38 carried by the threaded member 40. The cap member 50 clamped in place by the lock ring 52 maintains the units in assembled relation.

The yoke 78 may maintain a position perpendicular to the threaded member 40 as the threaded member moves up and down in the threaded aperture 39 in the base 26, the pin 72 shifting angularly as the mirror carrying rod 70 oscillates about the fulcrum 24 to vary the vertically adjusted position of the mirror assembly 10.

Our improved remote control actuating mechanism 100 for shifting the horizontal and vertical angular position of mirror 10 is illustrated in FIG. 1. It will be noted that a shell 102 has a flange 104 adapted to be held in contact with the under surface of the instrument panel of the vehicle in any convenient manner. For example the shell 102 may pass through a hole in a channel plate 106 and be drawn into firm contact with the instrument panel by means of screws extending through a trim plate 107. The rear portion of the shell 102 is reduced in diameter and is threaded as illustrated at 108 to receive a threaded fitting 109 surrounding the conduit 58 and secured thereto in fluid tight relation, by ferrule 110.

Rotatably mounted within the shell 102 is a sleeve 114 having a split stem 116 at one end to receive a manually operable knob 118 and a non-round cavity 112 in the other end. The flexible shaft 46 has a matching non-round terminal 113 which is a sliding fit in cavity 112. Sleeve 114 has a section of enlarged diameter threaded as illustrated at 120 extending from the bottom of cylinder 122 to a cap 126. Cylinder 122 is contoured as best illustrated at 134 in FIG. 3 to provide keyways to receive the corners of a square nut 130 threaded on the enlarged threaded section 120 of the sleeve 114. The cap 126 is secured in place to close the cylinder 122 by any suitable means as by staking as illustrated at 128.

The axial thickness of the nut 130 and the length of the cylinder 122 are calibrated with respect to the pitch of the threads 120 and the threads 42 of the threaded member 40 illustrated in FIG. 1 so that the face of nut 130 will abut the bottom wall 124 of cylinder 122 or the inner face of the cap 126 before the threaded member 40 of FIG. 1 contacts the interior surface of housing 22 at either end of the travel of member 40. The nut 130 having large surface contact with the members defining opposite ends of the cylinder 122 will engage at one end or the other before the threaded member 40 comes to the end of its travel in the internally threaded member 42 in the base 26 of FIG. 1. Binding of the actuating mechanism is thus prevented. The nut 120 will thus be restrained from rotating as the sleeve 114 and the threaded section 120 are rotated by rotation of the knob 118. The nut 120 will therefore move longitudinally in the cylinder 122 from the inner end 124 to the outer end defined by the inner surface of the cap 126. The nut 130 when engaged at opposite ends of the cylinder 122 presents large surface area contact which prevents the mechanism from binding as opposite ends of the actuating means are approached.

To adjust the rear view mirror 10 horizontally the control knob 118 is oscillated to the right or left thereby oscillating the flexible shaft 46 in the same direction to oscillate the member 40 (FIG. 1) with its crank 38, and the resulting oscillation of the crank 38 is translated into lateral shifting of the mirror carrying member 20 about the journal point 24.

To adjust the mirror 10 vertically, the control knob 118 is rotated and this rotation is transmitted through the flexible shaft 46 to shift the member 40 and the crank 38 axially in the cylindrical chamber 54. This axial movement shifts the angular position of mirror carrying member 20 and mirror 10 about the journal point 24 in a vertical plane to adjust the position of the mirror vertically.

It is thus apparent that our invention is a scanning device which scans the field in a succession of closely spaced substantially horizontal sweeps.

It should be explained that the sole purpose of the ball joint 18 is to provide an additional range to the mechanism described to compensate for the great variance in the angle of incidence when the mirror is mounted on the right fender as compared with a similar mounting on the left fender.

The setting up procedure is as follows. When the mirror is mounted on a vehicle the control knob 118 is rotated to the mid-point of its travel, and the screw 34 is loosened. Then, with an observer in the driver's seat the rear view mirror is positioned at approximately the middle position and the screw 34 is tightened permanently. Thereafter the mechanism provides ample range of adjusting movement to accommodate drivers of varying stature.

We claim:

1. A control mechanism for a rear view mirror for a motor vehicle comprising a base adapted to be secured to the motor vehicle, a head assembly carried by the base and including a casing, a mirror carrying member journalled for universal angular movement in the casing and having a portion projecting outwardly through an aperture in the casing, a threaded member rotatably mounted in the base, a crank arm carried by the threaded member and operably connected to the mirror carrying member whereby rotation of the threaded member oscillates and elevates the mirror carrying member in planes substantially perpendicular and parallel to the axis of the threaded member, an open ended yoke interposed between the crank arm and the mirror carrying member, a single manually rotatable member positioned in the vehicle, flexible driving means between the manually operable member and the threaded member, and stop means to limit rotational movement of the manually rotatable member in opposite directions.

2. The invention defined in claim 1 wherein a closed yoke is carried by the crank arm, and pivotal connecting means are interposed between one end of the closed yoke and the mirror carrying member.

3. A rear view mirror for a motor vehicle comprising a base adapted to be secured to a motor vehicle, a head assembly carried by the base and including a casing, a mirror carrying member journalled for universal movement in the casing, a yoke carried by the mirror carrying member, a threaded control member journalled for rotational movement in the base, eccentric connecting means carried by the threaded member and operably engaging said yoke whereby rotational movement of the threaded member varies the angular position of the mirror in a horizontal plane and the axial movement of the threaded member in the base varies the angular position of the mirror in a vertical plane, a manually rotatable member positioned in the vehicle, flexible driving means between the manually rotatable member and the threaded member to adjust the horizontal and vertical position of the mirror, and stop means to limit rotational movement of the manually rotatable member at opposite ends of the travel of the threaded member.

4. In a rear view mirror for a motor vehicle, a base adapted to be secured to an exterior surface of the vehicle, a rotatably mounted control knob positioned within the vehicle, a head assembly including a casing carried by the base, a member threadedly mounted in the base, connecting means between the knob and the threadedly mounted member, a mirror carrying member journalled in the casing, connecting means between the threadedly mounted member and the mirror carrying member comprising an eccentric driving member carried by the threadedly mounted member and yoke means secured to the mirror carrying member and engaging the eccentric driving member to effect movement of the mirror in planes substantially perpendicular and horizontal to the axis of the threadedly mounted member.

5. The invention defined in claim 4 wherein stop means are employed to limit rotational movement of the control knob in opposite directions.

References Cited in the file of this patent

UNITED STATES PATENTS

| | | |
|---|---|---|
| 1,491,937 | Walker | Apr. 29, 1924 |
| 1,688,214 | Walden | Oct. 16, 1928 |
| 2,315,260 | Lancaster | Mar. 30, 1943 |
| 2,456,362 | Aves | Dec. 14, 1948 |
| 2,585,399 | Mead | Feb. 12, 1952 |
| 2,614,437 | Meggitt | Oct. 21, 1952 |
| 2,623,986 | Falge | Dec. 30, 1952 |
| 2,664,029 | Higgins | Dec. 29, 1953 |
| 2,713,810 | Hill | July 26, 1955 |
| 2,734,997 | Frady | Feb. 14, 1956 |
| 2,817,005 | Cameron | Dec. 17, 1957 |
| 2,933,019 | Milton et al. | Apr. 19, 1960 |